United States Patent
Malachowsky et al.

(10) Patent No.: US 7,584,321 B1
(45) Date of Patent: Sep. 1, 2009

(54) MEMORY ADDRESS AND DATAPATH MULTIPLEXING

(75) Inventors: Chris Alan Malachowsky, Los Altos Hills, CA (US); David G. Reed, Saratoga, CA (US); Sean Jeffrey Treichler, Mountain View, CA (US); Brad W. Simeral, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 199 days.

(21) Appl. No.: 10/706,056

(22) Filed: Nov. 12, 2003

Related U.S. Application Data (60) Provisional application No. 60/499,094, filed on Aug. 28, 2003.

(51) Int. Cl.
*G06F 12/00* (2006.01)
*G09G 5/39* (2006.01)

(52) U.S. Cl. .................... 711/5; 711/104; 711/105; 711/150; 711/158; 345/531; 345/532; 345/536; 345/541; 710/307; 710/313

(58) Field of Classification Search ............. None
See application file for complete search history.

(56) References Cited

U.S. PATENT DOCUMENTS

| | | | | | |
|---|---|---|---|---|---|
| 5,896,492 | A | * | 4/1999 | Chong, Jr. | 714/3 |
| 6,026,464 | A | * | 2/2000 | Cohen | 711/5 |
| 6,145,042 | A | * | 11/2000 | Walton | 710/112 |
| 6,205,523 | B1 | * | 3/2001 | Joffe et al. | 711/150 |
| 6,333,935 | B1 | * | 12/2001 | Carr et al. | 370/442 |
| 6,380,945 | B1 | * | 4/2002 | MacInnis et al. | 345/602 |
| 6,496,908 | B1 | * | 12/2002 | Kamvysselis et al. | 711/162 |
| 6,868,486 | B1 | * | 3/2005 | Ward | 711/158 |
| 6,993,610 | B2 | * | 1/2006 | Coffey et al. | 710/74 |
| 2001/0043081 | A1 | * | 11/2001 | Rees | 326/38 |

* cited by examiner

*Primary Examiner*—Hyung S Sough
*Assistant Examiner*—Kaushikkumar Patel
(74) *Attorney, Agent, or Firm*—Townsend and Townsend and Crew LLP (57) ABSTRACT

Circuits, methods, and apparatus for multiplexing addresses and data at a memory interface such that multiple data widths are provided without the need to change a motherboard or other printed circuit board design. A specific embodiment of the present invention achieves this using a single integrated circuit design where the datapath width is selected using a bonding option, fuse, data input, or other selection mechanism. The specific embodiment supports both 64 and 128-bit datapaths, though other numbers of datapaths, and other datapath widths are supported by other embodiments.

24 Claims, 8 Drawing Sheets

|  | | | 800 |
| --- | --- | --- | --- |
| 810 \ MODE | 820 \ ACTIVE MEMORY | 832 \ 760 | MULTIPLEXER — 830 INPUT SELECT — 834 765, 70, 75 |
| 840 — 64 - bit | 720 | B — 864 | A — 855 |
| 842 — 64 - bit | 730 | A — 862 | A — 855 |
| 844 — 128 - bit | 720 | B — 860 | B — 850 |
| 846 — 128 - bit | 730 | B — 860 | B — 850 |

FIG. 8

MEMORY ADDRESS AND DATAPATH MULTIPLEXING

CROSS-REFERENCES TO RELATED APPLICATIONS

This application claims the benefit of U.S. provisional patent application No. 60/499,094, titled MEMORY ADDRESS AND DATAPATH MULTIPLEXING, by Malachowsky et al., filed Aug. 28, 2003, which is incorporated by reference.

BACKGROUND

The present invention relates generally to multiplexing addresses and data at a memory interface, and more specifically to multiplexing address and data information to support multiple datapath widths with a single memory interface design.

In conventional computer systems, it has been common to use a device known as a Northbridge to handle data transfers between a central processing unit (CPU) and a system or main memory. The datapath between the Northbridge and the main memory has conventionally been 64 bits in width.

Recent improvements to this architecture have involved replacing the Northbridge with an integrated graphics processor (IGP), for example, an nForce™2 IGP by NVIDIA Corporation of Santa Clara, Calif. This IGP, like its Northbridge predecessor, communicates with both the CPU and main memory.

One of the improvements the nForce2 IGP provides over a conventional Northbridge is a wider 128-bit data path. This wider datapath reduces the bottleneck that occurs at the main memory in conventional computer systems. While this 128-bit data bus provides greatly improved performance over conventional 64-bit buses, it is desirable to provide devices having both 128-bit and 64-bit data buses to the marketplace. In this way, an array of products having different levels of performance at different price points can be offered by motherboard manufacturers.

Development costs for each motherboard are typically quite high, and can currently be on the order of $1 Million. Thus, it is very desirable to use one board design for both 64 and 128-bit modes of operation. Similar concerns exist for integrated circuit manufacturers, in that each new device must be separately tested, stocked, shipped, and inventoried.

Thus, what is needed are circuits, methods, and apparatus for memory interfaces that can support both a 64 and 128-bit datapath without changing the motherboard design. Further, it is preferable that one integrated circuit support both modes.

SUMMARY

Accordingly, embodiments of the present invention provide circuits, methods, and apparatus for multiplexing addresses and data at a memory interface such that multiple data widths are provided without the need to change a motherboard or other printed circuit board design. A specific embodiment of the present invention achieves this using a single integrated circuit design where the datapath width is selected using a bonding option, fuse, data input, or other selection mechanism. The specific embodiment supports both 64 and 128-bit datapaths, though other numbers of datapaths, and other datapath widths are supported by other embodiments. For example, three datapath widths of 64, 128, and 256 bits is supported by an embodiment of the present invention. Another supports both 128 and 256-bit widths.

The specific embodiment is typically incorporated on an nForce2 IGP. Alternately, embodiments of the present invention may be used on an otherwise conventional Northbridge, on a graphics processor, or other circuit which interfaces to one or more memory banks.

An exemplary embodiment of the present invention provides a computing system. This computing system provides a central processing unit, a first memory bank, a second memory bank, and a circuit having a first interface configured to send and receive data to and from the central processing unit, and a second interface configured to write and read data to and from the first memory bank and the second memory bank. The second interface includes a first memory controller coupled to a first address bus, a first data bus, a second address bus, and a second data bus, and a second memory controller coupled to the second address bus and the second data bus. The second interface is configurable such that the first memory controller provides a first address on the first address bus and the second address bus and a first plurality of data bits on the first data bus and the second data bus, and the first address bus and first data bus are coupled to the first memory bank and the second address bus and second data bus are coupled to the second memory bank.

Another exemplary embodiment of the present invention provides an integrated circuit. This integrated circuit includes a first interface configured to send and receive data to and from a central processing unit, and a second interface configured to write and read data to and from a first memory bank and a second memory bank. The second interface includes a first memory controller coupled to a first address bus, a first data bus, a second address bus, and a second data bus, and a second memory controller coupled to the second address bus and the second data bus. The second interface is configurable such that the first memory controller provides a first address on the first address bus and the second address bus and a first plurality of data bits on the first data bus and the second data bus.

A further embodiment of the present invention provides another integrated circuit. This integrated circuit includes a first memory controller having a data input, a data output, and an address output, a second memory controller having a data input, a data output, and an address output a first plurality of pads, a second plurality of pads, a first plurality of input/output circuits coupled to the first plurality of pads, a second plurality of input/output circuits coupled to the second plurality of pads, a first multiplexer coupled to the first plurality of input/output circuits and the first memory controller data input, a second multiplexer coupled to the first memory controller address output, the second memory controller address output, and the second plurality of input/output circuits, and a third multiplexer coupled to the first memory controller data output, the second memory controller data output, and the second plurality of input/output circuits.

Yet another exemplary embodiment of the present invention provides a memory interface circuit. This memory interface includes a first memory controller coupled to a first address bus, a first data bus, a second address bus, and a second data bus, and a second memory controller coupled to the second address bus and the second data bus. The memory interface is configurable such that the first memory controller provides a first address on the first address bus and the second address bus and a first plurality of data bits on the first data bus and the second data bus. The memory interface is alternately configurable such that the first memory controller provides a first address on the first address bus and a first plurality of data bits on the first data bus, and the second memory controller provides a second address on the second address bus and a second plurality of data bits on the second data bus.

Yet another exemplary embodiment of the present invention provides a method of multiplexing data at a memory interface. This method includes providing a plurality of first addresses for a first memory bank using a first memory controller, and providing a plurality of first data bits for the first memory bank using the first memory controller, and either providing a plurality of second addresses for a second memory bank using the first memory controller, and providing a plurality of second data bits for the second memory bank using the first memory controller, or providing a plurality of second addresses for a second memory bank using a second memory controller, and providing a plurality of second data bits for the second memory bank using the second memory controller.

Still another exemplary embodiment of the present invention provides a method of multiplexing data and address signals at a memory interface. This method includes providing a first address to a first memory bank using a first memory controller address port, providing a first plurality of data bits to the first memory bank using a first memory controller data port, selectively providing a second address to a second memory bank by multiplexing the first memory controller address port and a second memory controller address port, and selectively providing a second plurality of data bits to a second memory bank by multiplexing the first memory controller data port and a second memory controller data port. A better understanding of the nature and advantages of the present invention may be gained with reference to the following detailed description and the accompanying drawings.

DESCRIPTION OF EXEMPLARY EMBODIMENTS

Figure 1:
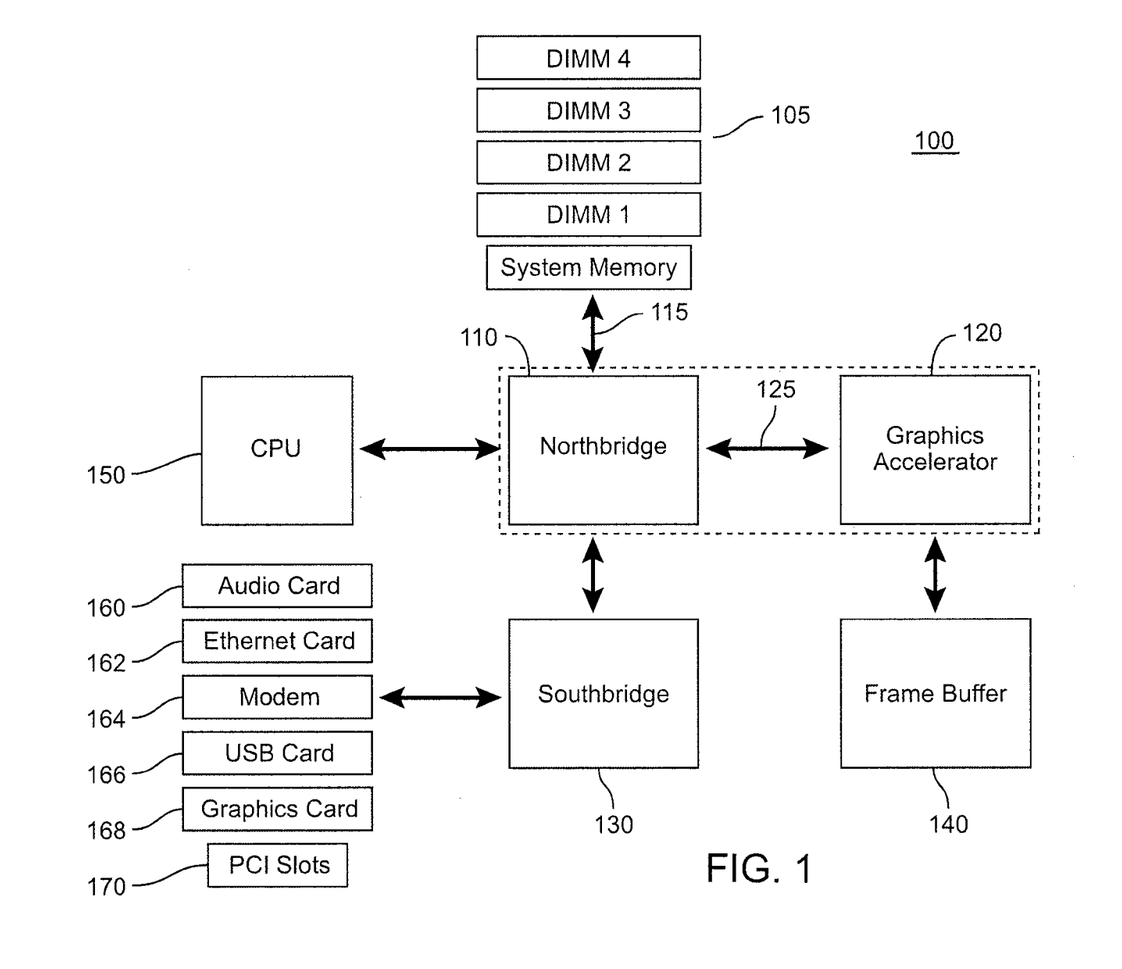
FIG. 1 is a block diagram of a computing system that benefits by incorporation of embodiments of the present invention.

FIG. 1 is a block diagram of a computing system 100 that benefits by incorporation of embodiments of the present invention. Included are a Northbridge 110, graphics accelerator 120, Southbridge 130, frame buffer 140, central processing unit (CPU) 150, audio card 160, Ethernet card 162, modem 164, USB card 166, graphics card 168, PCI slots 170, and memories 105. This figure, as with all the included figures, is shown for illustrative purposes only, and does not limit either the possible embodiments of the present invention or the claims.

The Northbridge 110 passes information from the CPU 150 to and from the memory 105, graphics accelerator 120, and Southbridge 130. Southbridge 130 interfaces to external communication systems through connections such as the universal serial bus (USB) card 166 and Ethernet card 162. The graphics accelerator 120 receives graphics information over the accelerated graphics port (AGP) bus 125 through the Northbridge 110 from CPU 150 and directly from memory or frame buffer 140. The graphics accelerator 120 interfaces with the frame buffer 140. Frame buffer 140 may include a display buffer which stores the pixels to be displayed.

In this architecture, CPU 150 performs the bulk of the processing tasks required by this computing system. In particular, the graphics accelerator 120 relies on the CPU to set up calculations and compute geometry values. Also, the audio or sound card 160 relies on the CPU to process audio data, positional computations, and various effects, such as chorus, reverb, obstruction, occlusion, and the like, all simultaneously. Moreover, the CPU remains responsible for other instructions related to applications that may be running, as well as for the control of the various peripheral devices connected to the Southbridge.

Figure 2:
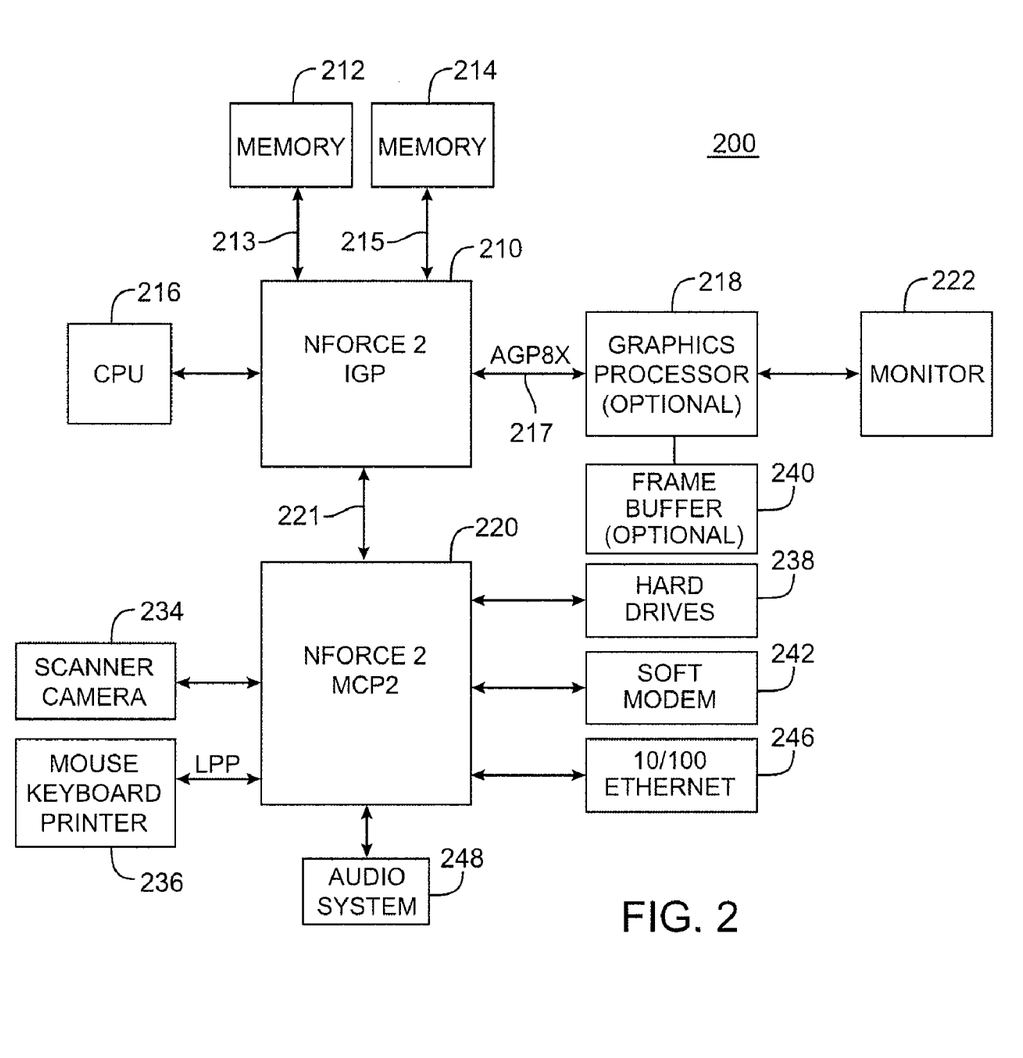
FIG. 2 is a block diagram of an improved computer system that benefits by incorporation of embodiments of the present invention.

FIG. 2 is a block diagram of an improved computer system that benefits by incorporation of embodiments of the present invention. Included are an nForce2 integrated graphics processor (IGP) 210, an nForce2 media communications processor (MCP2) 220, memory 212 and 214, CPU 216, optional graphics processor 218 and frame buffer 240, monitor 222, scanner or camera 234, mouse, keyboard, and printer 236, hard drives 238, soft modem 242, Ethernet connection 246, and audio system 248.

This revolutionary system architecture has been designed around a distributed processing platform, which frees up the CPU to perform tasks best suited to it. Specifically, the nForce2 IGP 210 includes a graphics processing unit (GPU) which is able to perform graphics computations previously left to the CPU. Alternately, the nForce2 IGP 210 may interface to an external GPU which performs these computations. Also, nForce2 MCP2 220 includes an audio processing unit (APU), which is capable of performing many of the audio computations previously done by the CPU. In this way, by CPU is free to perform its tasks more efficiently. Also, by incorporating a suite of networking and communications technologies such as USB and Ethernet 246, the nForce2 MCP2 220 is able to perform much of the communication tasks that were previously the responsibility of the CPU 216.

In this architecture, the nForce2 IGP 210 communicates with memories 212 and 214 of over buses 213 and 215. These buses include address and data lines. In a specific embodiment, these address lines are each 15 bits wide, while the data lines are 64 bits wide. In another embodiment, the address buses are each 14 bits wide. It will be appreciated by one skilled in the art that different bus widths may be required depending on the requirements of a specific embodiment of the present invention. This architecture is referred to as the Twinbank™ architecture. The nForce2 IGP 210 also interfaces to an optional graphics processor 218 over an advanced AGP bus 217. In various computer systems, this external processor may be removed, and the monitor 222 may be driven by the nForce2 IGP directly. In other systems, there may be more than one monitor, some or all of which are coupled to optional graphics processors or the nForce2 IGP directly. The nForce2 IGP 210 communicates with the nForce2 MCP2 220 over a Hypertransport link 221. The optional graphics processor 218, may also interface with external memory, which is not shown in this example. Embodiments of the present invention may be used to improve the memory interfaces to memories 212 and 214, from the graphics processor 218 to its external memory, or to other optional memories not shown here, or other memory interfaces in other digital systems.

It will be appreciated by one skilled in the art that there are many modifications that may be made to this example consistent with the present invention. For example, the widths of the data and address buses may vary. Also, there may be more than two memory banks interfacing with the nForce2 IGP.

The nForce2 MCP2 220 contains controllers for Ethernet connections 246 and soft modem 242. Also included are an interface for a mouse, keyboard, and printer 236, and USB ports for cameras, scanners, and hard drives 234 and 238.

This arrangement allows the CPU, the nForce2 IGP, and the nForce2 MCP2, to perform processing independently, concurrently, and in a parallel fashion.

Figure 3:
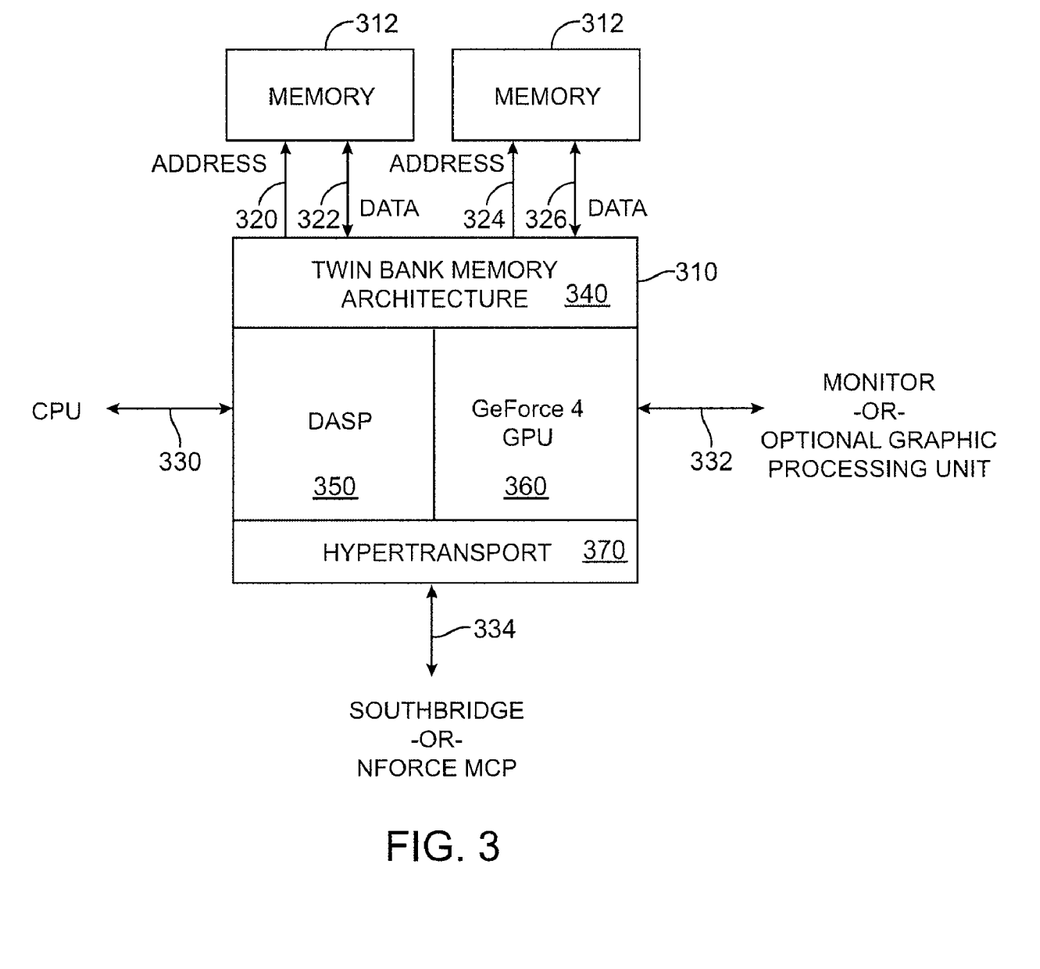
FIG. 3 illustrates an nForce2 IGP that incorporates an embodiment of the present invention.

FIG. 3 illustrates an nForce2 IGP that incorporates an embodiment of the present invention. Included are an nForce2 IGP 310, and memories 312 and 314. The nForce2 IGP 310 includes a Twinbank memory architecture interface 340, dynamic adaptive speculative pre-processor (DASP) 350, graphics processing unit (GPU) 360, and Hypertransport interface 370.

The DASP 350 interfaces with the CPU over bus 330. The DASP 350 increases performance by intelligently predicting possible memory accesses based on historical CPU memory access patterns, and storing them in an on-chip buffer for fast retrieval by the CPU. Because the CPU can access this buffer or cache faster than it can access the main system memory, overall system performance is improved. The GeForce4™ GPU 360 interfaces either directly with a monitor, or optional graphics processing or acceleration units. If an optional graphics processing or acceleration unit is not used, the GPU 360 output DAC drives the monitor directly. If an optional graphics processing or acceleration unit is used, the GeForce4 GPU 360 interfaces with the unit over the AGP bus. The Hypertransport interface 370 interfaces with a Southbridge or nForce2 MCP2 circuit over bus 334. The Hypertransport interface provides a high-speed isochronous interface that is capable of transferring data at a rate of 800 MB/sec or higher.

The Twinbank memory interface 340 provides address buses to memory banks 312 and 314. The address buses 320 and 324 may include 1, 2, or more address buses. In a specific embodiment of the present invention, each of the address buses 320 and 324 includes address bus lines for addressing memory DIMMs or other circuits in each memory banks 312 and 314. The Twinbank memory interface circuitry 340 also provides a data bus to each of the memory banks 312 and 314. In a specific embodiment of the present invention, the data buses 322 and 326 are 64 bits wide. This two channel memory architecture helps eliminate memory bottlenecks that occur in ordinary memory interface architectures.

Figure 4:
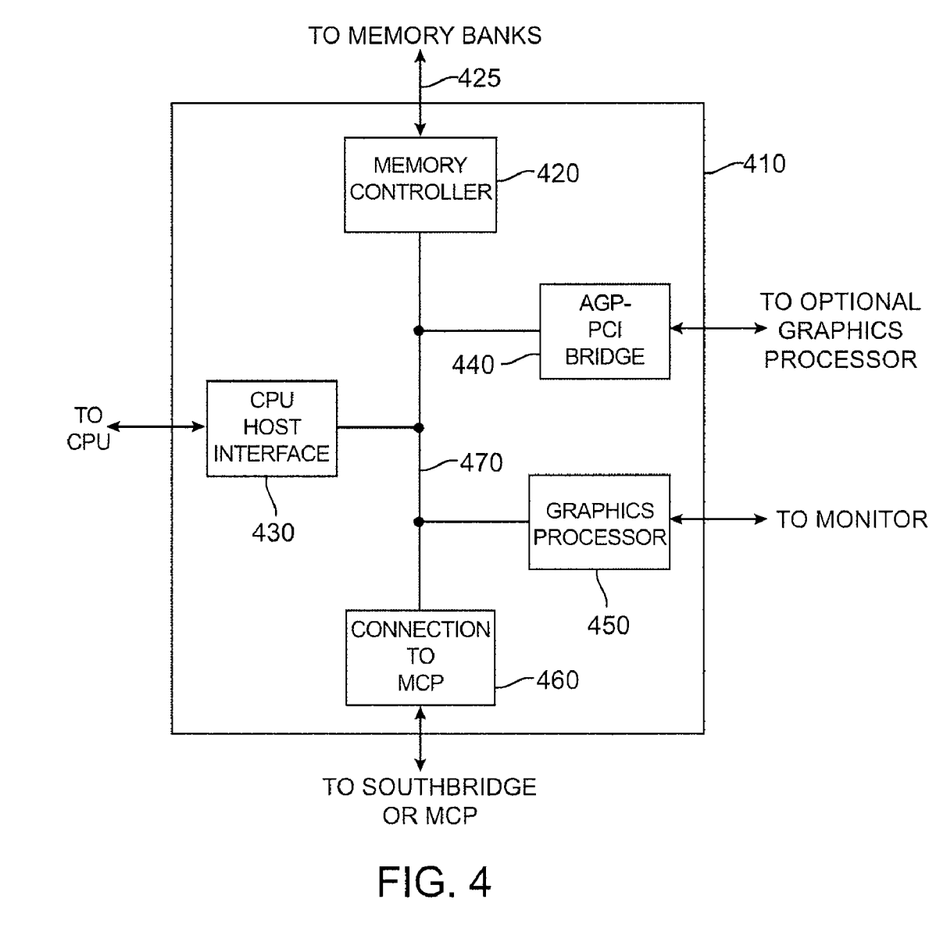
FIG. 4 is a block diagram of an nForce2 IGP that incorporates an embodiment of the present invention.

FIG. 4 is a block diagram of an nForce2 IGP 410 that incorporates embodiments of the present invention. Included are a memory controller 420, CPU host interface 430, AGP-PCI bridge 440, graphics processor 450, and a connection to nForce2 MCP2 460, and internal bus 470.

The memory controller 420 interfaces to one or more memory banks over lines 425. Again, in a specific embodiment of the present invention, the memory controller 420 is a Twinbank memory architecture interface, which is connected to two memory banks, each memory bank including one or more memory circuits, DIMMs, SIMMs, or other type of device. These memories, as with all the memories in the included figures, may be double-data-rate (DDR) memories, state-random access memories (SRAMs), or other memory types. The CPU host interface 430 couples the IGP chip to the CPU. The AGP-PCI bridge 440 provides a connection from the IGP to an optional external graphics processor. The graphics processor 450 may be left off-chip when an optional graphics processor is used. The graphics processor 450 provides output ports which can drive a monitor. In a specific embodiment of the present invention, the graphics processor 450 provides three DACs capable of operation at 350 MHz. A connection to an nForce2 MCP2 is also provided by circuit 460. In a specific embodiment of the present invention, this circuit is a Hypertransport interface. This circuit sends and receives data to a Southbridge, nForce2 MCP2, or other circuit.

Figure 5:
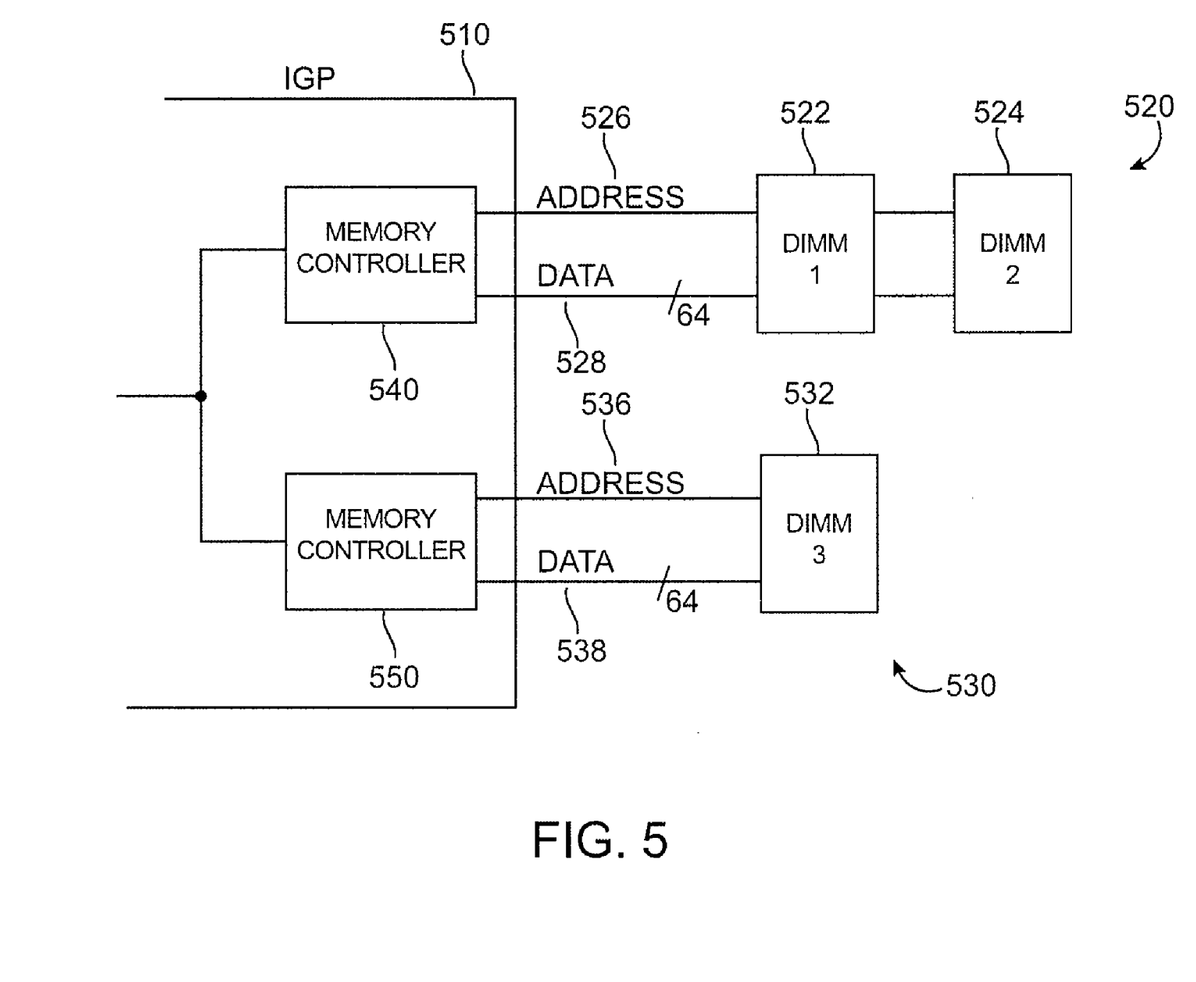
FIG. 5 is a block diagram showing the interface between an nForce2 IGP and two memory banks.

FIG. 5 is a block diagram showing the interface between an nForce2 IGP and Two memory banks. Included are the IGP 510 and memory banks 520 and 530. The IGP 510 includes a first memory controller 540 and a second memory controller 550. Memory bank 520 includes a first memory circuit or DIMM 522 and a second memory circuit or DIMM 524. The second memory bank 530 includes a third memory circuit or DIMM 532. It will be obvious to one skilled in the art that other numbers of memory controllers may be included in the IGP 510, and that other numbers of DIMMs may be included in each of the memory banks 520 and 530.

The first memory controller 540 provides an address bus 526 and a data bus 528 to the first memory bank. In a specific embodiment of the present invention, the data bus 528 is 64 bits wide, and the address bus 526 is sufficiently wide to provide a unique address for each group of 64 memory locations in the first and second memory circuits 522 and 524. The address bus 526 may be considered as one address bus shared by the first and second memory circuits 522 and 524, or as two individual address buses, one each provided to each memory module individually. For example, the memory controller 540 may provide two address buses, each n-bits wide, and driven by separate drivers. In an embodiment of the present invention, a chip select signal is used to select a DIMM, or more specifically one side of a DIMM. Alternately, the memory controller may provide one address bus that is (n+m)-bits wide that is shared by both memory circuits, where m is the number of bits needed to uniquely address the second memory bank.

The second memory controller 550 provides an address bus 536 and a data bus 538 to the second memory bank 530. Again, in a specific embodiment of the present invention, the data bus 538 is 64 bits wide, while the address bus 526 is sufficiently wide to uniquely identify each group of 64 memory locations in the memory circuit 532.

The architecture of FIG. 5, the Twinbank memory interface architecture, provides an effective 128-bit data bus that reduces memory bottlenecks associated with typical 64-bit bus architectures. However, various motherboard manufacturers are often interested in providing a lower functionality device that can be sold at a lower price point. Specifically, an IGP 510 which provide one 64 bit bus to three memory circuits 522, 524, and 532 is desired.

This can be achieved by removing the second memory controller 550 and coupling the three memory circuits to the address and data buses 526 and 528. But this results in excessive loading of the output drivers. Better performance can be achieved if each memory bank is driven independently. Also, shorting the buses in this way would entail providing a separate motherboards for 64-bit and 128-bit operation. Since each motherboard costs approximately $1 million to develop, and since separate motherboards would require separate stocking numbers, inventory, and the like, this solution is undesirable. Instead, it is desirable to provide an IGP 510, that is capable of operating in the 128-bit mode shown in FIG. 5, as well as in a 64-bit mode.

Figure 6:
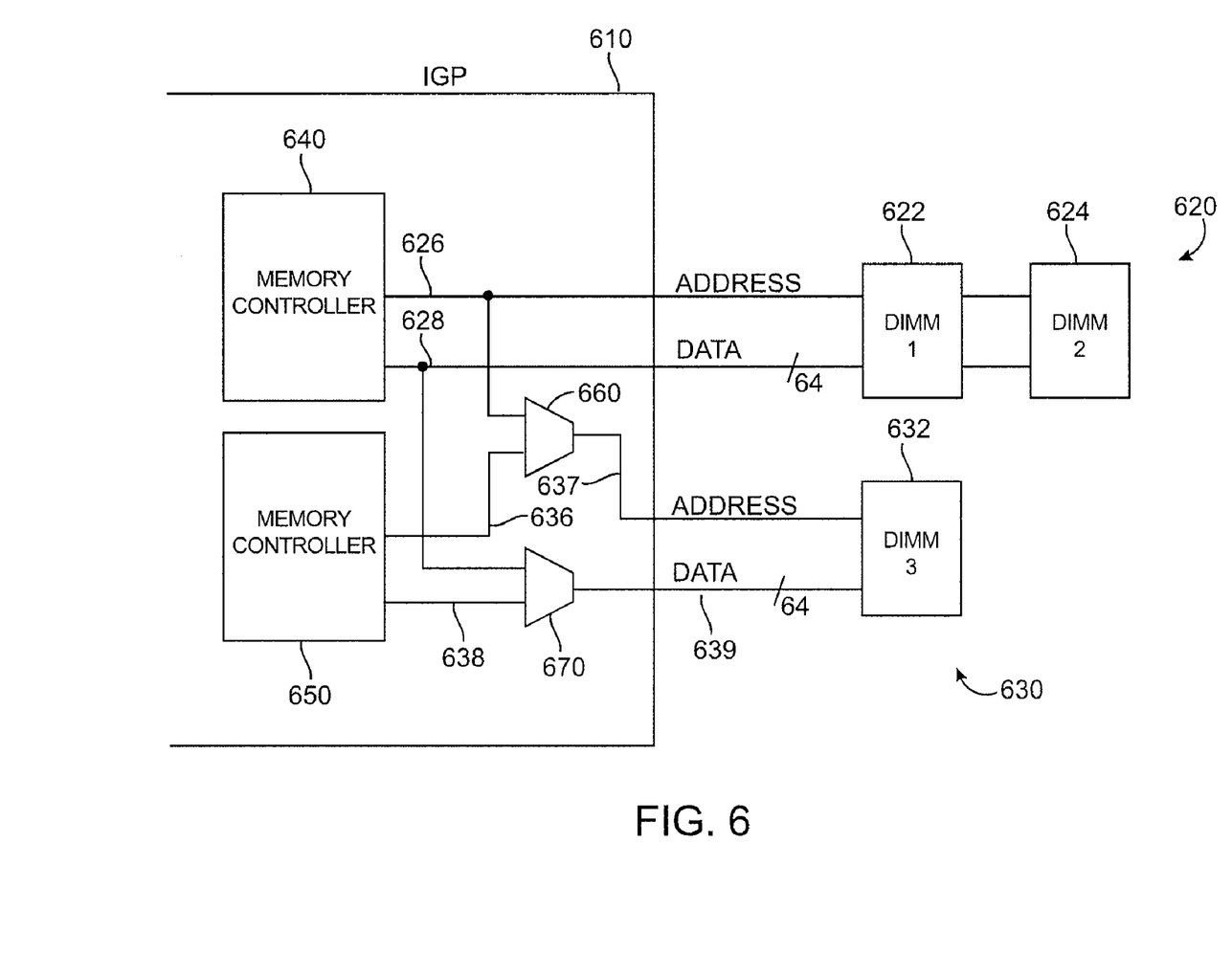
FIG. 6 illustrates a block diagram showing the interface between an nForce2 IGP and two memory banks that is consistent with an embodiment of the present invention.

FIG. 6 illustrates a block diagram showing a Twinbank interface between an nForce2 IGP and two memory banks that is consistent with an embodiment of the present invention. Included are an nForce2 IGP 610, a first memory bank 620, and a second memory bank 630. The IGP 610 includes a first memory controller 640, a second memory controller 650, a first multiplexer 660, and a second multiplexer 670. The first memory bank 620 includes a first memory circuit 622 and a second memory circuit 624, while the second memory bank 630 includes a third memory circuit 632. It will be appreciated by one skilled in the art that there may be changes to this example consistent with embodiments of the present invention. For example, there may be different numbers of memory circuits in each memory bank and there may be a different number of memory banks.

The first memory controller 640 provides a first address bus 626 to the first memory bank 620 and the first multiplexer 660. The first memory controller 640 also provides a first data bus to the first memory bank 620, and the second multiplexer 670. The second memory controller 650 provides a second address bus 636 to the first multiplexer 660 and a second data bus 638 to the second multiplexer 670. In this simplified block diagram, multiplexer 660 multiplexes between address buses 626 and 636 to provide addresses on bus 637, while the second multiplexer 670 is a bi-directional multiplexer which either multiplexes data from data bus 628 and 638 to bus 639, multiplexes data from bus 639 to data buses 628 or 638. One skilled in the art will appreciate that the data multiplexer 670 may be two multiplexers, one for multiplexing write data and connected as 670 is shown, and another for reading data. This read data multiplexer may, for example, be connected to receive data from buses 628 and 639 and to provide data to the first memory controller 640. In this configuration, the second memory controller may receive data directly from bus 639.

When the circuit of FIG. 6 is operating in the 128-bit mode, the first memory controller provides addresses on bus 626 and data on bus 628 to first memory bank 620. During write operations in the 128-bit mode the second memory controller 650 provides addresses on bus 636 which are passed by multiplexer 660 to address bus 637 to the second memory bank 630. Also, the second memory-controller 650 provides data on bus 638 which is multiplexed by the second multiplexer 670 to the data bus 639, where it is received by the memory bank 630.

During read operations in the 128-bit mode, addresses are provided by the first memory controller 640 on bus 626 to the first memory bank, while read data is provided by the first memory bank onto bus 628 where it is received by the first memory controller 640. Also, addresses are provided by the second memory controller 650 on bus 636, then multiplexed by the first multiplexer 660 onto a bus 637 where they are received by the second memory bank 630. Also, data read out of the second memory bank 630 is provided on the bus 639, where it is multiplexed by multiplexer 670 onto bus 638, and is read by the second memory controller 650.

When the circuit shown in FIG. 6 operates in 64-bit mode, the first memory controller 640 provides addresses on bus 626 to the first memory bank 620. Also, the first multiplexer 660 multiplexes the addresses on bus 626 to bus 637, where they are provided to the second memory bank 630. During write operations, the first memory controller 640 provides data on bus 628 to the first to memory bank 620. Also, the second multiplexer 670 provides data on bus 628 to bus 639, where it is received by the second memory bank 630.

During read operations, data is provided by the first memory bank 620 on bus 628, where it is received by the first memory controller 640, and by the second memory bank 630 on bus 639 where it is multiplexed by multiplexer 670 onto bus 628, where it is received by the first memory controller. In this way, the first memory controller provides addresses and data to both the first memory bank 620 and second memory bank 630. In the 64-bit mode, the second memory controller 650 may be disabled, powered down, or simply ignored. By multiplexing addresses through the first multiplexer 660 and data through the second multiplexer 670, the IGP 610 may operate in either a 64 or 128-bit mode.

In a specific embodiment of the present invention, the 64 or 128-bit modes are selected by bonding options. For example, a bond wire may be tied either to the VCC or ground, while the voltage level selects a mode of operation. One way to do this is to have adjacent VCC and ground pads on the chip. A third pad between the VCC and ground pads is coupled as an input to a logic circuit, and the third pad is either bonded to VCC or ground. Alternately, a bond pad may be tied to an on-chip resistor or other resistance that is connected to ground. If the bond pad is not bonded, the input will be pulled to ground and one mode is selected or the bond pad may be tied to VCC and the other node selected. Alternately, fuse links may be blown or left intact, where the presence or absence of a link selects a mode. If a dedicated input pin is used, then only one integrated circuit product needs to be manufactured, which simplifies stocking, inventory, ordering, and the like, but has a downside in that it does require a dedicated pin, and can be defeated by unscrupulous vendors or end users.

The timing requirements for modern memory interfaces are becoming quite stringent. Accordingly, a specific embodiment of the present invention performs the address and data multiplexing one or more and stages into the IGP circuit. That is, if the memory controller includes one or more pipelined stages, this multiplexing occurs after one or more of these pipeline stages. In this way, the multiplexing of the address and data signals does not interfere with timing at the critical memory interfaces. In other embodiments of the present invention, there is no pipeline stage before the multiplexers, for example, where the timing is not as critical, the input multiplexers have a sufficiently fast delay time, or the delay time or the delays of the multiplexers are compensated for.

Figure 7:
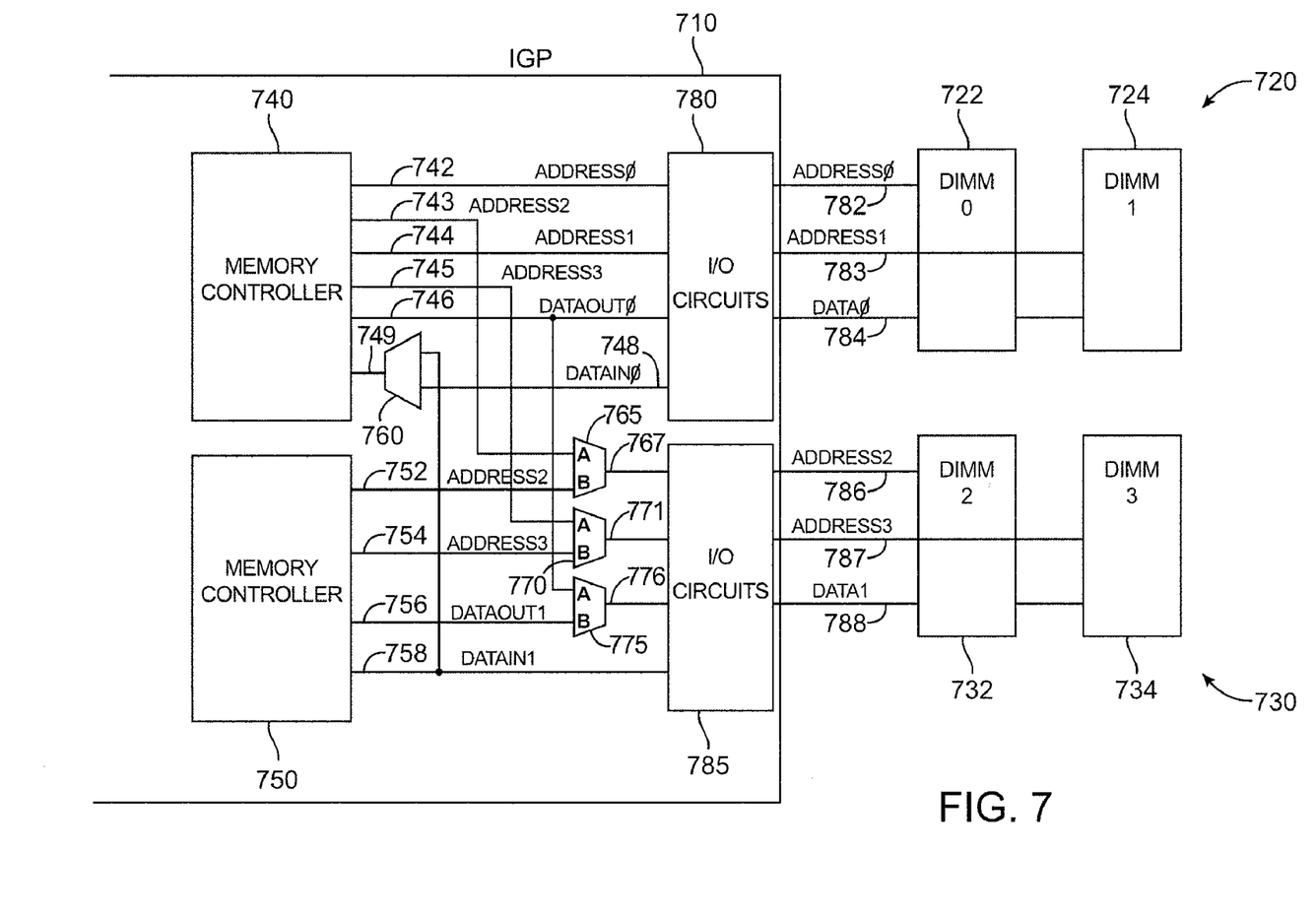
FIG. 7 illustrates a block diagram showing an interface between an nForce2 IGP and two memory banks that is consistent with an embodiment of the present invention.

FIG. 7 illustrates a block diagram showing a Twinbank interface between an nForce2 IGP and two memory banks that is consistent with an embodiment of the present invention. Included are an IGP 710, a first memory bank 720, and a second memory bank 730. The IGP 710 includes a first memory controller 740, a second memory controller 750, multiplexers 760, 765, 770, and 775, and input output (I/O) circuits 780 and 785. The first memory bank 720 includes a first memory circuit 722 and a second memory circuit 724, while the second memory bank 730 includes a first memory circuit 732 and a second memory circuit 734. The input/output circuits 780 and 785 may include circuits for retiming data, such as flip-flops or other storage elements.

The first memory controller 740 provides addresses on address buses 742, 733, 744, and 745, and provides data on bus 746, while it receives data on bus 749. The second memory controller 750 provides addresses on buses 752 and 754, and provides data on bus 756, while it receives data on bus 758. The multiplexer 760 receives read data from the first and second I/O circuits 780 and 785 and multiplexes them onto bus 749. Multiplexer 765 receives address buses from the first and second memory controllers 740 and 750 and multiplexes them onto bus 767 which is received by the second I/O circuits 785. The multiplexer 770 receives address information from the memory controllers, and multiplexes them on bus 771 to the second I/O circuits 785. Similarly, multiplexer 775 receives data output from the first and second memory controllers 740 and 750, and provides an output on bus 776 to the second I/O circuits 785. The first I/O circuits 780 provides addresses and data to the first memory bank, while the second I/O circuits 785 provides addresses and data to the second memory bank.

In the 128-bit mode, the first memory controller 740 provides addresses on bus 742 and 744 to the I/O circuit 780, which in turn passes address information on bus 782 to the first memory circuit 722, and on bus 783 to the second memory circuit 724. Similarly, the second memory controller 750 provides addresses on buses 752 and 754, which are multiplexed by multiplexers 765 and 770 to the second I/O circuits 785. The second I/O circuits 785 provides addresses on buses 786 to the third memory circuits 732, and on bus 787 to the fourth memory circuit 734.

When writing data in the 128-bit mode, data is provided by the first memory controller on bus 746 to the first I/O circuits 780, which in turn provides it on bus 784 to the first and second memory circuits 722 and 724. Similarly, the second memory controller 750 provides data on bus 756 to multiplexer 775, which in turn provides it to the second I/O circuit 785. The second I/O circuits 785 provides data on bus 788 to the third memory circuit 732 and the fourth memory circuit 734.

While reading data in the 128-bit mode, the first memory circuit 722 and second memory circuit 724 provides data on bus 784 to the first I/O circuits 780. The first I/O circuits 780 provides data on bus 748 to multiplexer 760, which in turn provides that data to the first memory controller 740. Similarly, the third and fourth memory circuits 732 and 734 provides data on bus 788 to the second I/O circuits 785. The second I/O circuits 785 provides this data on bus 758 to the second memory controller 750.

In the 64-bit mode of operation, the second memory controller 750 is disabled, disconnected, powered down, or otherwise ignored. The first memory controller 740 provides addresses on buses 742 and 744 to the first I/O circuits, and on buses 743 and 745 to the multiplexer 765 and 770, which in turn provides those addresses to the second I/O circuits 785. The first I/O circuits 780 and second I/O circuits 785 in turn provides those addresses to the first memory bank 720 and second memory bank 730.

When writing data in the 64-bit mode, the first memory controller 740 provides data on bus 746 to the first I/O circuits 780, and to multiplexer 775, which in turn provides it to the second I/O circuits 785. The first I/O circuits 780 and second I/O circuits 785 in turn provide data on buses 784 and 788 to the first and second memory banks.

When reading data in the 64-bit mode, the first and second memory banks 720 and 730, provide data on buses 784 and 788, which is received by the first I/O circuit 780 and second I/O circuits 785. The first I/O circuits 780 and second I/O circuits 785 in turn provides data on buses 748 and 758 to the multiplexer 760. The multiplexer 760 directs this data to the first memory controller 740 as is appropriate.

It will be appreciated by one skilled in the art that variations of this circuit may be made consistent with embodiments of the present invention. For example, in a specific embodiment, the multiplexer 760 is not used, and the buses 748 and 758 are received by the first memory controller 740. In this case, the memory controller is instructed to receive data on bus 758 when in the 64 bit configuration.

Figure 8:
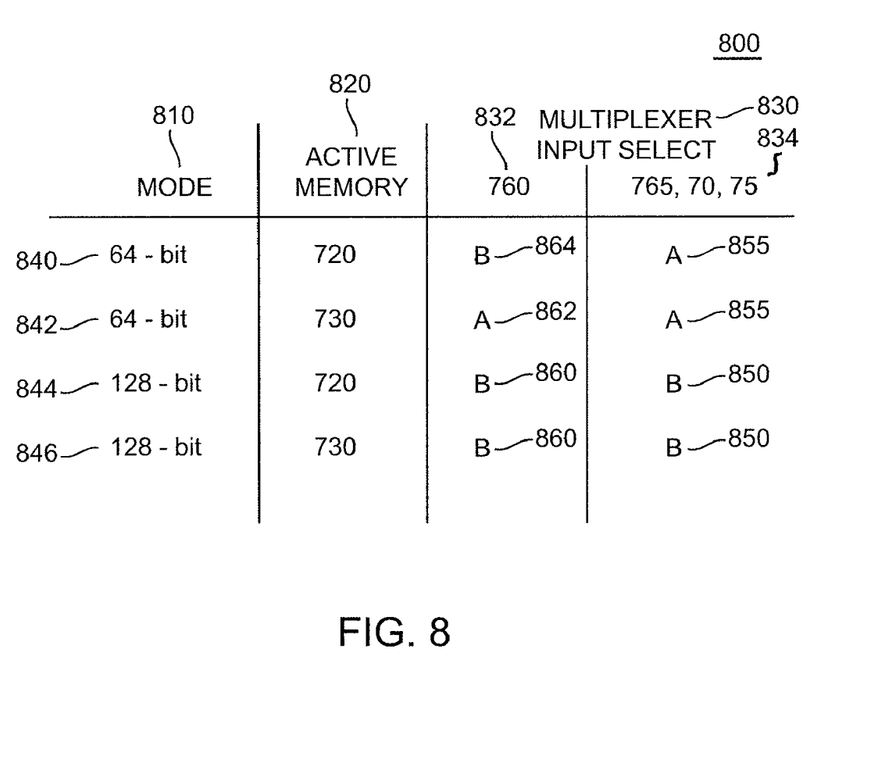
FIG. 8 is a chart illustrating the operation of the multiplexers from FIG. 7 in 64 and 128-bit modes.

FIG. 8 is a chart illustrating the operation of the multiplexers 760, 765, 770, and 775 from FIG. 7 in the 64 and 128-bit mode. The modes of operation are listed in column 810, while the memory that is active, that is either being read from or written to, is listed in 820. Column 830 lists the input that is active for these multiplexers in the various modes. Specifically, column 832 lists the active input for multiplexer 760, while column 834 lists the active input for multiplexers 765, 770, and 775. As can be seen, the active input for multiplexer 765, 770, and 775 is simply dependent upon whether the IGP is operating in a 64 or 128-bit mode. Specifically, if the device is in the 64-bit mode, the A input of the multiplexer is selected, wherein when the 128-bit mode selected, the B input of the multiplexer is selected.

The input selection for multiplexer 760 is slightly more complicated. Again, whenever the device is in the 128-bit mode, the multiplexer's B input is selected. However, in the 64-bit mode, the input selected depends on which memory bank is active. Specifically, when memory bank 720 is active the B input of the multiplexer selected, wherein if memory bank 730 is active, the A input is selected. In this way, data from the appropriate memory bank is steered to the appropriate memory controller.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A computing system comprising:
 a central processing unit;
 a first memory bank;
 a second memory bank; and
 a circuit having a first interface configured to send and receive data to and from the central processing unit, and a second interface configured to write and read data to and from the first memory bank and the second memory bank,
 wherein the second interface comprises:
  a first memory controller coupled to a first address bus, a first data bus, a second address bus, and a second data bus; and
  a second memory controller coupled only to the second address bus and the second data bus, wherein the first and second memory controllers are each coupled with the first interface,
 wherein the second interface is configurable such that the first memory controller provides a first address on the first address bus and the second address bus at the same time, and a first plurality of data bits on the first data bus and the second data bus at the same time, and
 wherein the first address bus and first data bus are coupled to the first memory bank, and the second address bus and second data bus are coupled to the second memory bank.

2. The computing system of claim 1 wherein the second interface is alternately configurable such that the first memory controller provides a first address on the first address bus and a first plurality of data bits on the first data bus, and the second memory controller provides a second address on the second address bus and a second plurality of data bits on the second data bus.

3. The computing system of claim 2 wherein the second interface is configured based on a bonding option.

4. The computing system of claim 2 wherein the second interface is configured based on one of the group consisting of a bonding option, an input voltage level, and a state of a fuse.

5. The computing system of claim 1, further comprising:
a first multiplexer having a first input coupled to the first memory controller, a second input coupled to the second memory controller and an out put connected to the second address bus, and
a second multiplexer having a first input coupled to the first memory controller, a second input coupled to the second memory controller and an output connected to the second data bus.

6. The computing system of claim 1, wherein the second interface is configured to operate in a first mode and a second mode, wherein in the first mode, the second interface is capable of transmitting data at a rate that is twice the bandwidth of the second mode, and
wherein in the first mode, the second interface is configured such that the first memory controller provides the first address on the first address bus and the first plurality of data bits on the first data bus and such that the second memory controller provides a second address on the second address bus and a second plurality of data bits on the second data bus, and
wherein in the second mode, the second interface is configured such that the first memory controller provides a first address on the first address bus and the second address bus at the same time, and a first plurality of data bits on the first data bus and the second data bus at the same time.

7. An integrated circuit comprising:
a first interface configured to send and receive data to and from a central processing unit, and a second interface configured to write and read data to and from a first memory bank and a second memory bank;
wherein the second interface comprises:
a first memory controller coupled to a first address bus, a first data bus, a second address bus, and a second data bus; and
a second memory controller coupled to the second address bus and the second data bus,
wherein the second interface is configurable such that the first memory controller provides a first address on the first address bus and the second address bus at the same time, and a first plurality of data bits on the first data bus and the second data bus at the same time, and
wherein while the first memory controller provides a first address on the first address bus and the second address bus at the same time, and a first plurality of data bits on the first data bus and the second data bus at the same time, the second memory controller is disabled.

8. The integrated circuit of claim 7 wherein the second interface is alternately configurable such that the first memory controller provides a first address on the first address bus and a first plurality of data bits on the first data bus, and the second memory controller provides a second address on the second address bus and a second plurality of data bits on the second data bus.

9. The integrated circuit of claim 8 wherein the first address bus and first data bus are coupled to the first memory bank and the second address bus and second data bus are coupled to the second memory bank.

10. The integrated circuit of claim 9 wherein the second interface is configured based on a bonding option.

11. The integrated circuit of claim 9 wherein the second interface is configured based on one of the group consisting of a bonding option, an input voltage level, and a state of a fuse.

12. The integrated circuit of claim 8 further comprising:
a graphics processor; and
an advanced graphics port interface.

13. The integrated circuit of claim 9 further configured to operate in a first mode and a second mode, wherein in the first mode, the memory interface is capable of transmitting data at a rate that is twice the bandwidth of the second mode, and
wherein in the first mode the first memory controller is coupled to the first memory bank and second memory controller is coupled to the second memory bank, and in the second mode the first memory controller is coupled to the first memory bank and second memory bank.

14. An integrated circuit comprising:
a first memory controller having a data input, a data output, and a first address output;
a second memory controller having a data input, a data output, and an address output;
a first plurality of pads to couple to a first address bus and a first data bus;
a second plurality of pads to couple to a second address bus and a second data bus;
a first plurality of input/output circuits coupled to the first plurality of pads;
a second plurality of input/output circuits coupled to the second plurality of pads;
a first multiplexer having a first input coupled to the first plurality of input/output circuits, a second input coupled to the second plurality of input/output circuits, and an output coupled to the first memory controller data input;
a second multiplexer having a first input coupled to the first memory controller first address output, a second input coupled to the second memory controller address output, and an output coupled to the second plurality of input/output circuits; and
a third multiplexer having a first input coupled to the first memory controller data output, a second input coupled to the second memory controller data output, and an output coupled to the second plurality of input/output circuits,
wherein when the first input of the second multiplexer is selected, the first memory controller simultaneously provides an address to the first plurality of input/output circuits and the second plurality of input/output circuits, and when the first input of the third multiplexer is selected, the first memory controller simultaneously provides data to the first plurality of input/output circuits and the second plurality of input/output circuits and
wherein the second memory controller is not coupled to the first address bus and the first data bus.

15. The integrated circuit of claim 14 wherein the first plurality of input/output circuits and the second plurality of input/output circuits each comprise a plurality of flip-flops.

16. The integrated circuit of claim 14 wherein the first memory controller first address output is coupled to the first plurality of input/output circuits.

17. The integrated circuit of claim 14 wherein the first memory controller further comprises a second address output, the first memory controller second address output coupled to the first plurality of input/output circuits.

18. A memory interface circuit comprising:
a first memory controller coupled to a first address bus, a first data bus, a second address bus, and a second data bus; and a second memory controller coupled to the second address bus and the second data bus, wherein the memory interface is configurable such that the first memory controller simultaneously provides a first address on the first address bus and the second address bus and the first memory controller simultaneously provides a first plurality of data bits on the first data bus and the second data bus;

wherein the memory interface is alternately configurable such that the first memory controller provides a first address on the first address bus and a first plurality of data bits on the first data bus, and the second memory controller provides a second address on the second address bus and a second plurality of data bits on the second data bus, and wherein while the first memory controller simultaneously provides a first address on the first address bus and the second address bus and the first memory controller simultaneously provides a first plurality of data bits on the first data bus and the second data bus, the second memory controller is disabled.

19. The memory interface circuit of claim 18 wherein the first address bus and first data bus are coupled to a first memory bank and the second address bus and second data bus are coupled to a second memory bank.

20. The memory interface circuit of claim 18 wherein the first and second memory controller each comprise:

an input/output circuit coupled to a plurality of pads; and a plurality of multiplexers coupled to the input output circuit.

21. The memory interface circuit of claim 20 wherein the input/output circuit comprises a plurality of flip-flops.

22. A method of multiplexing data at a memory interface comprising:

performing a first memory access by:

providing a plurality of first addresses on a first address bus for a first memory bank using a first memory controller; and providing a plurality of first data bits on a first data bus for the first memory bank using the first memory controller; and selectively determining whether to perform a second memory access by:

providing a plurality of second addresses on a second address bus for a second memory bank using the first memory controller; and providing a plurality of second data bits on a second data bus for the second memory bank using the first memory controller, wherein the plurality of first data bits are different from the plurality of second data bits; or whether to perform a third memory access by:

providing a plurality of second addresses on the second address bus for a second memory bank using a second memory controller; and providing a plurality of second data bits on the second data bus for the second memory bank using the second memory controller;

wherein while providing a plurality of second addresses for a second memory bank using the first memory controller and providing a plurality of second data bits for the second memory bank using the first memory controller, the second memory controller is disabled.

23. A method of multiplexing data and address signals at a memory interface comprising:

providing a first address to a first memory bank using a first memory controller address port;

providing a first plurality of data bits to the first memory bank using a first memory controller data port;

selectively providing a second address to a second memory bank by multiplexing the first memory controller address port and a second memory controller address port; and selectively providing a second plurality of data bits to a second memory bank by multiplexing the first memory controller data port and a second memory controller data port, wherein the second memory controller data port and address port only provide addresses and data to the second memory bank.

24. The method of claim 23 further comprising:

receiving a third plurality of data bits from the first memory bank using the first memory controller data port; and selectively receiving a fourth plurality of data bits from the second memory bank by multiplexing the first memory controller data port and the second memory controller data port.

* * * * *